Figure 1:
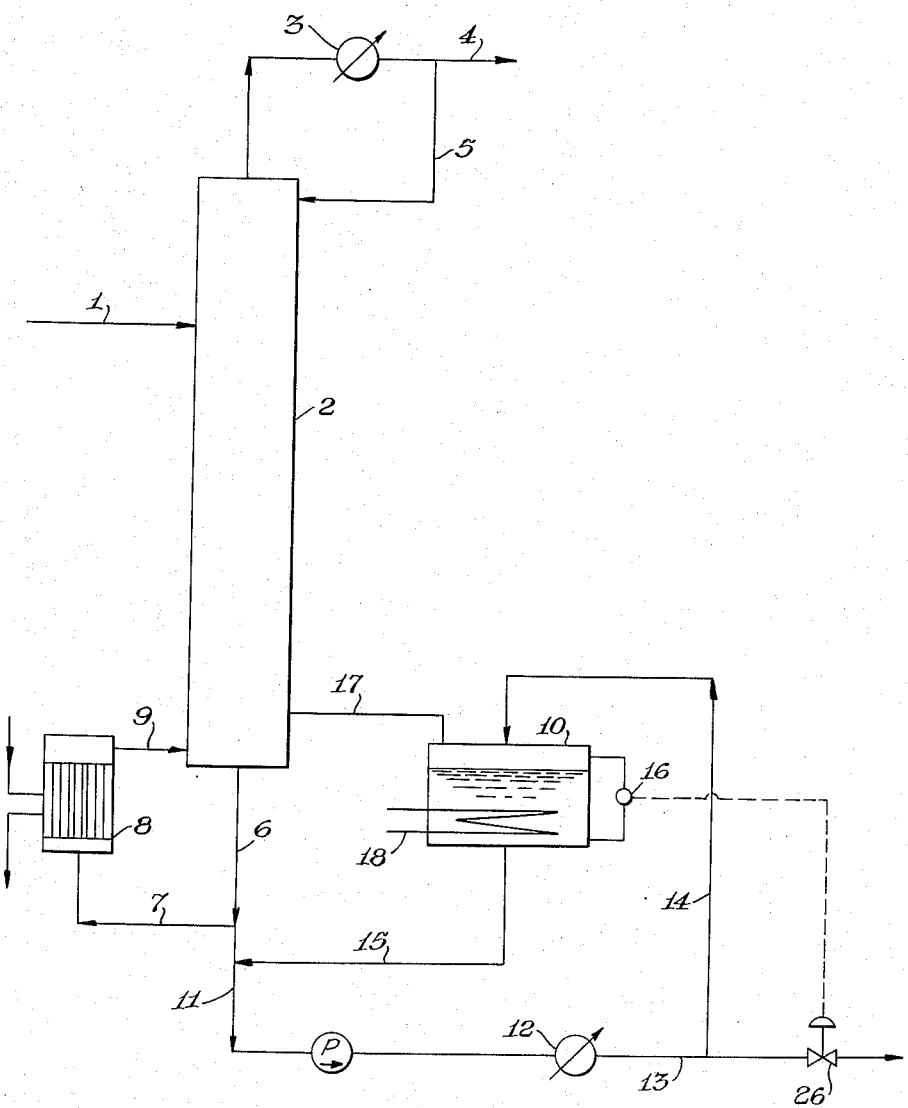

Dec. 29, 1953     K. E. COULTER     2,664,391
CONTINUOUS DISTALLATION OF HEAT SENSITIVE COMPOUNDS
Filed March 28, 1952     2 Sheets-Sheet 1

INVENTOR
Kenneth E. Coulter

BY Griswold & Burdick
ATTORNEYS

Patented Dec. 29, 1953

2,664,391

UNITED STATES PATENT OFFICE 2,664,391

CONTINUOUS DISTILLATION OF HEAT SENSITIVE COMPOUNDS

Kenneth E. Coulter, Midland, Mich., assignor to The Dow Chemical Company, Midland, Mich., a corporation of Delaware Application March 28, 1952, Serial No. 279,097

3 Claims. (Cl. 202—40)

This invention relates to the distillation of heat-polymerizable or thermally unstable materials in continuously operating stills.

Such stills are customarily devised with a rectifying column, a primary feed supply entering the column at a midsection of the latter, a vapor condensing system receiving vapors issuing from the top of the column and usually provided with facilities for returning a part of the condensed top product back into the column as reflux, part of the liquid in the column reaching the bottom of the column and being passed off as bottoms product while part of such bottoms is vaporized in a callandria, or reboiler, which supplies heat to the column.

In carrying out a continuous distillation with such a conventional still, it is customary to maintain the callandria, or reboiler, filled with a sufficient liquid portion of the distillation mixture to cover the heating surfaces thereof, since this avoids fluctuations in column temperatures which might otherwise occur. As a consequence, a considerable portion of the distillation mixture is subjected to prolonged heating at its boiling temperature. The inventory time, i. e. the average time required for passage of an infinitesimal portion of the feed material through the distillation system, is often in the order of from 3 to 7 hours. A large part of this inventory time is due to the heating, or repeated reheating, of a considerable portion of the distillation mixture in the callandria or reboiler.

Because of the prolonged heating during such a continuous fractional distillation in a conventional still, thermally unstable materials and polymerizable materials often undergo chemical changes, e. g. decomposition or polymerization, which result in large losses and may cause plugging or other operating difficulties. There are several known ways for avoiding, or reducing the extent of, such losses, e. g. by carrying the distillation out under vacuum or by adding agents which stabilize the material under treatment, but they are not always successful and in some instances are, of themselves, disadvantageous. For instance, a lowering of the pressure reduces the productive capacity of a still and sometimes reduces the efficiency of fractionation. Use of stabilizing agents sometimes results in contamination of the desired product. Even when using such conventional ways for curtailing the occurrence of chemical changes during distillation, such changes often do occur to an appreciable extent with resultant losses of material.

This invention supplements these old procedures for the distillation of heat-sensitive substances in continuous stills by providing a novel method and arrangement of distilling apparatus which permits holding a part of the necessary inventory of the still at a temperature lower than that existing in other parts of the still, e. g., at a temperature below that at which chemical changes occur to an appreciable extent.

As hereinbefore mentioned, a considerable inventory of liquid is required in a distilling system in order to maintain the liquid phase and vapor phase in thermodynamic equilibria. Also, changes in operating conditions are usually required from time to time in order to compensate for changes in the compositions of the feed material, or the products, and to effect the proper control. In order to permit such control changes, it is necessary that there be a buffering capacity of liquid in the system so that the still will neither flood nor run dry.

This invention provides for this necessary inventory of liquid, but comprises a method and apparatus for holding a considerable portion of the inventory at a lower temperature than would otherwise prevail. This is accomplished by providing a vessel adjacent to and offset from the column, communicating therewith to receive the bottoms product, or residue liquid, and further communicating with the reboiler, or reboilers, and with such other storage or processing devices as would ordinarily be employed. This auxiliary vessel is so positioned that practically no bottoms product remains in the bottom of the column, but rather resides in that auxiliary vessel in quantity adequate for satisfactory control of the distillation operations. Liquid-level controls may be placed in the vessel to operate flow valves in conventional manner. The inventory of bottoms product in the auxiliary vessel may advantageously be cooled by any desired means such as by cooling coils therein, or the contents may be circulated through a heat exchanger or like device to effect such cooling.

Figure 2:
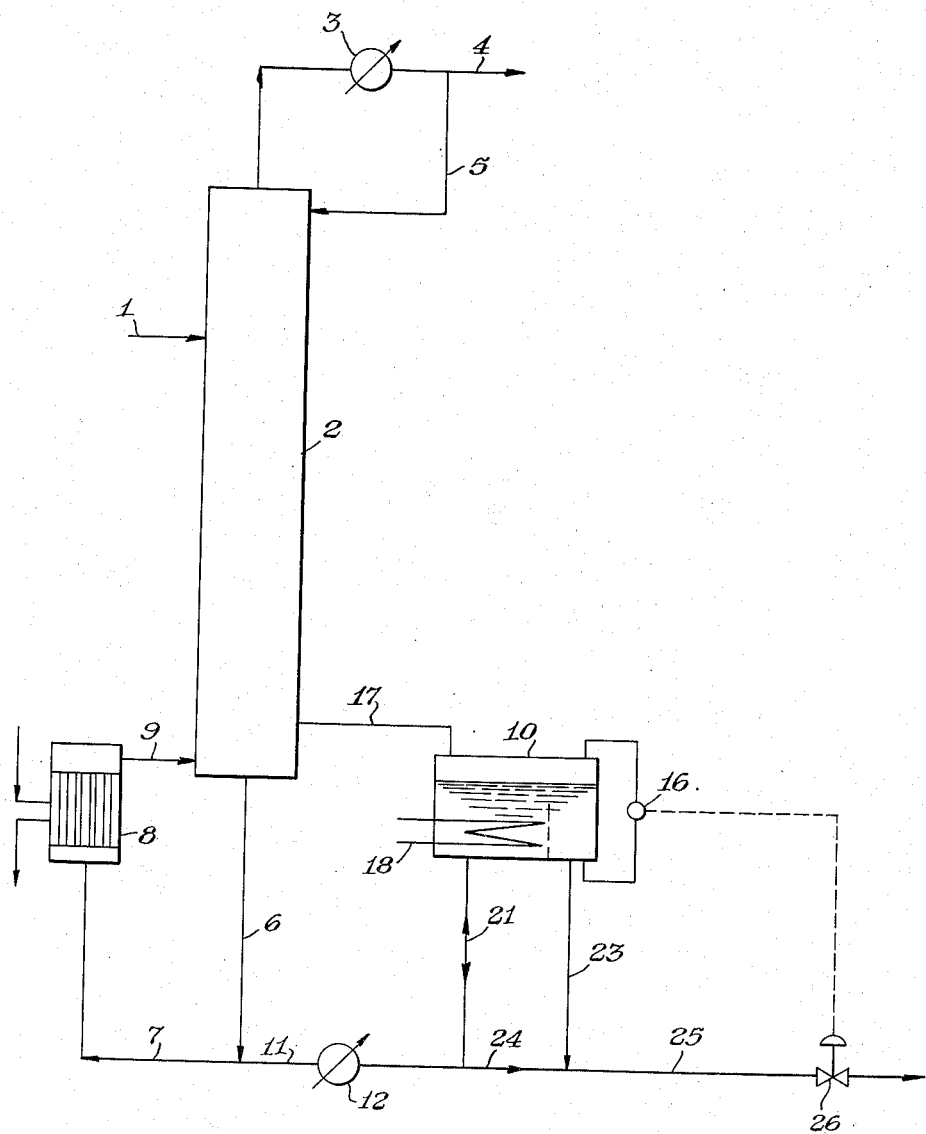

The accompanying drawings illustrate, in schematic manner, two of various arrangements of apparatus which may be employed in practice of the invention. The individual parts of the apparatus are old, but each of the arrangements, or combinations, of apparatus is new. Fig. 1 shows one arrangement of the essential parts of a continuous still constructed in accordance with this invention; Fig. 2 shows a modification thereof.

In the apparatus of Fig. 1, a material to be distilled is fed through line 1 into the rectifying column 2 which may be of any conventional design. Within column 2, the composition is subjected to rectifying conditions, the lower boiling components rising as vapor to the top of the column there to be condensed in the condensing system 3, part of the condensate being withdrawn via line 4 while part of the condensate is returned to the column as reflux via line 5. Higher-boiling components of the mixture undergoing rectification in column 2 descend as a residual liquid phase to the bottom of the column and flow out of column 2 via line 6. Part of the bottoms liquid passing through line 6 flows through line 7 to the boiler 8. The latter may be of any conventional or suitable design, but preferably is of the vertical tube natural circulation type which has a maximum of heat exchange surface with a minimum of inventory volume. The liquid is heated and partially vaporized in boiler 8, the vapor and any entrained liquid returning through line 9 to the column 2, thereby supplying heat to the mixture in said column. Part of the bottoms liquid passes through line 11, which may contain a pump, through a heat exchanger or cooler 12 and hence through line 13 to storage or to other processing. As thus far described, the equipment and its operation are conventional. According to this invention, part of the bottoms liquid flowing through line 11, heat exchanger 12, and line 13 is passed via line 14 to a storage tank 10, thence via line 15 back to complete a circuit with line 11. Tank 10 is preferably equipped with a liquid level controller 16 of any desired design capable of controlling the flow of product out of the system through line 13, as for example by activating the operation of valve 26, in response to changes in level of liquid in tank 10. Tank 10 is also connected to column 2 through the pressure-equalizing line 17. Since the pressures in the bottom of column 2 and in tank 10 are equalized through line 17, the liquid level in column 2 and in tank 10 are the same and the liquid level in the bottom of column 2 may be held constant by appropriate positioning of tank 10 and of its liquid level controller 16, if such a controller is used. The level of liquid in the bottom end of column 2 may be reduced to the point just adequate to keep line 6 full and supplied with liquid. The contents of tank 10 may, if desired, be cooled by indirect heat exchange with a heat exchange medium either by means of a jacket about tank 10 or by means of a coil 18 or other device within tank 10, or by circulation through a heat exchanger such as 12 in the circuit as shown, or by a combination of such means.

In Fig. 2 is shown a modification of this apparatus in which parts similar to those of Fig. 1 are similarly numbered. In Fig. 2, that part of the bottoms product flowing through line 6 which is not returned to the column through the reboiler 8 passes via line 11 and line 21 to tank 10. The latter may contain cooling coil 18 or be provided with other indirect heat exchanger means. A liquid level control 16 may be provided to operate the flow control valve 26 in line 25 thereby regulating the rate of flow of effluent material from tank 10 through lines 23 and 25. In another modification, line 24 provides a by-pass of tank 10, the inventory in tank 10 thereby becoming a more or less stagnant buffer to maintain a constant level of liquid in boiler 8. In operation, the arrangement of apparatus as in Fig. 2 performs the same function and accomplishes results similar to that of Fig. 1, except that in the arrangement of Fig. 1, the contents of tank 10 are continuously circulating through the circuit of line 11, heat exchanger 12 if used, line 13, line 14, tank 10 and line 15, outgoing product being removed from this circuit at some convenient point, whereas in the apparatus of Fig. 2 the outgoing product makes a "once-through" traverse of line 11, heat exchanger 12, if used, line 21, tank 10 and lines 23 and 25; or, alternatively, flows from the system through lines 11, 24 and 25.

While the apparatus and method of the described invention are applicable to the distillation of any mixture susceptible of distillation, the invention is particularly advantageous as applied to the distillation of mixtures containing heat sensitive components, especially when such heat sensitive components are the higher-boiling components and tend to concentrate in the bottoms product of the still.

The following examples describe ways in which the invention has been applied in distilling unstable substances, but are not to be construed as limiting the invention.

EXAMPLE 1

This example illustrates the application of this invention to the separation of vinyltoluene (i. e. toluene having one of its nuclear hydrogen atoms replaced by a vinyl group, sometimes called arylmethylstyrene) from a crude reaction mixture which was obtained by the dehydrogenation of ethyltoluene and consisted essentially of about 62 weight per cent ethyltoluene and lower-boiler substances and about 38 weight per cent vinyltoluene.

The distillation apparatus was of the continuous operating type and comprised two columns in series with each other; the first of the columns was 12 inches in diameter and 38 feet long, and the second of the columns was 8 inches in diameter and 30 feet long. Both columns were packed with 1-inch Berl saddles. The assembly of apparatus for each column resembled that of Fig. 2. At the top of each column was a vapor condensing system corresponding to 3. At the bottom of each column was a steam-heated vertical tube reboiler (corresponding to 8) having about 13.8 square feet of heat exchange surfaces and a total volume of about 4 gallons.

At the bottom of each column there was also an inventory vessel corresponding to 10. This vessel had a total volume of about 20 gallons and contained a pipe coil (corresponding to 18) through which water was passed to cool the contents of the vessel. In this apparatus there was no heat exchanger corresponding to 12 in Fig. 2.

In both units, the column, reboiler and inventory vessel were arranged so that a minimum of liquid material was retained in the hot zone at the bottom of the still. Very little liquid was retained in the bottom of the column itself. The reboiler was positioned so that its tubes were normally submerged in liquid for most efficient heat transfer and was of a type known to have a maximum of heat transfer surface for a minimum of inventory volume. Together with the connecting lines, the reboiler circuit held from 5 to 10 gallons of liquid at the temperature of boiling. The inventory vessel was positioned so that it operated about half-full of liquid, i. e. it contained about 11 gallons of liquid bottoms product which was cooled by the cooling coil immersed therein. Each inventory tank was equipped with a liquid level control device (corresponding to 16) which co-operated to control the rate of flow of material through the product line by activating a regulating valve therein (corresponding to 26 in line 25).

The crude vinyltoluene, containing a minor amount of a polymerization inhibitor, was fed to the first column operating at an absolute pressure of about 30 mm. of mercury at the top of the column. Part of the condensate from the top of the first column was returned as reflux to the column and part was removed as ethyltoluene distillate. Part of the liquid bottoms product was revaporized by heating in the reboiler, thus furnishing heat to the column. Part of the liquid bottoms product from the first column was conducted to the inventory vessel from whence it was pumped to the second column, thus corresponding to flow through lines 6, 11, 21, tank 10, lines 23 and 25; line 24 was omitted.

The condensate top product distillate from the second column, which was operated at an absolute pressure of about 30 mm. of mercury at the top of the column, was returned to the bottom of the first column. Part of the liquid bottoms product from the second column was revaporized by heating in the reboiler, thus furnishing heat to the column. Part of the liquid bottoms product from the second column was conducted to storage as a concentrated vinyltoluene. This flow of vinyltoluene to storage was in communication with, but by-passed, the bottoms inventory vessel, thus corresponding to flow through lines 6, 11, 24 and 25; tank 10 was in communication with this flow through line 21; line 23 was omitted.

During the distillation, the following temperatures were observed:

In the bottom of the first column__ About 101° C.
In the bottom of the second column_ About 116° C.
In the inventory vessels_____ About 60–65° C.

In Table I are reported data collected during a four-day period of continuous operation. The rates of feed, rates of distillate withdrawal and rates of residue withdrawal are average rates in pounds per hour for each day's operation. Small samples of the residue bottoms product from the second distillation column were taken from time to time and combined into a composite sample representing each day's product. Each composite sample was analyzed for vinyltoluene. These determinations are reported in Table I as weight per cent vinyltoluene in the residue from the second distillation column. By difference from 100 per cent, these assay values of vinyltoluene are a measure of the total amount of impurities present in the vinyltoluene residue. The impurities include ethyltoluene not completely removed by the distillation, polymeric vinyltoluene formed during the distillation, the polymerization inhibitor which was present in the feed to the distillation, and tarry matter. In Table I the polymeric content of the residue from the second distillation column is indicated as less than the arithmetic difference between 100 per cent and the vinyltoluene assay value. These data indicate that only negligible amounts of polymer were formed in the distillation for concentration of the vinyltoluene.

*Table I*

| Sample No. | Feed to first column, lbs./hr. average | Distillate, first column, lbs./hr. average | Residue, second column, lbs./hr. average | Analysis of residue from second column, weight percent | |
|---|---|---|---|---|---|
| | | | | Vinyl toluene | Polymer |
| 1 | 96.5 | 58.5 | 38.0 | 97.8 | Less than 2.2 |
| 2 | 99.8 | 58.8 | 41.0 | 98.8 | Less than 1.2 |
| 3 | 101 | 51.5 | 49.5 | 98.3 | Less than 1.7 |
| 4 | 103.4 | 56.1 | 47.3 | 98.0 | Less than 2.0 |

EXAMPLE 2

In each of several pairs of comparative experiments, vinyltoluene, containing 10 parts per million of para-tertiary-butylcatechol as a polymerization inhibitor, was fed at a constant rate to each of two stills which, for convenience, will be referred to as stills A and B, respectively, and was withdrawn as bottom product from each still. Both stills were operated under total reflux so that the rate of withdrawal of each bottom product would correspond, on a weight basis, to the rate of feed. Still A had a conventional bottom arrangement of parts consisting of a still pot, an outlet for overflow of product from the still pot, an offset reboiler, and lines connecting the reboiler with the pot. The still pot and reboiler and connecting lines had a total liquid capacity of 214 cc. Still B did not have a still pot, but instead had an offset reboiler attached by connecting lines to the bottom of its column and an offset liquid reservoir which was connected by a line to the reboiler and which was positioned so as to maintain a liquid level in the same and in the reboiler connected therewith such that both were filled with liquid. The liquid level was approximately even with the bottom of the column. The reboiler and its connecting lines had a liquid capacity of 95 cc. The reservoir had a liquid capacity of 119 cc. It was provided with means for cooling the liquid therein and with an outlet for overflow of the liquid product. In other words, the still A had a conventional arrangement of bottom parts and practically all of the liquid circulating through the still pot, the offset reboiler and the connecting lines was maintained at approximately the boiling temperature. In contrast, the combination of bottom parts of still B, i. e. the reboiler, reservoir and lines connecting them with the bottom of the still column, were in accord with the present invention and were such that about 55 per cent of the total amount of liquid therein, i. e., the liquid in the reservoir, was maintained at a temperature lower than the boiling temperature. Both of the stills A and B were operated simultaneously in carrying out each pair of comparative tests, and both stills were connected to a single source of vacuum so that both experiments were carried out at the same pressure. The reservoir of the still arrangement B was cooled to maintain the liquid therein at temperatures of from 25° to 35° C. In each pair of comparative experiments, the feed of vinyltoluene to the stills and the withdrawal of the bottoms product was continued for from 5 to 6 hours. Throughout this period each product was collected in a receiving vessel. Thereafter, a sample of each product was tested to determine the proportion of polymerized vinyltoluene therein. The proportion of polymer was determined by heating a weighed sample of the product under vacuum at 216° C. to remove the monomeric vinyltoluene and weighing the polymer residue. Table II indicates which experiments were carried out with still A under conditions such that the entire liquid inventory in the still pot and reboiler was hot, i. e., at approximately the boiling temperature, and which experiments were carried out using still B with a major portion of the inventory cold, i. e., at from 25° to 35° C. The table gives the rate of feed of vinyltoluene, the reflux temperature, and the absolute pressure in the still column for each experiment. It also gives the per cent by weight of polymer in the product from each experiment.

Table II

| Run No. | Still A—Hot inventory | | | | Run No. | Still B—Cold inventory | | | |
| --- | --- | --- | --- | --- | --- | --- | --- | --- | --- |
| | Temperature, °C. | Rate, cc./hr. | Pressure, mm. hg abs. | Polymer, percent weight | | Temperature, °C. | Rate, cc./hr. | Pressure, mm. hg abs. | Polymer, percent weight |
| 1 | 108–112 | 150 | 140 | 0.3 | 1 | 113 | 140 | 140 | 0.3 |
| 2 | 117–120 | 152 | 180 | 3.6 | 2 | 121 | 156 | 180 | 1.5 |
| 3 | 116–121 | 150 | 180 | 3.7 | 3 | 119–121 | 140 | 180 | 1.9 |
| 4 | 125–127 | 156 | 225 | 12.6 | 4 | 127–129 | 156 | 225 | 2.8 |

From the data of Table II it is evident that, when a heat-polymerizable material is distilled in apparatus modified by the improvement of this invention and according to its improved method, less polymer is formed in the bottoms product than is formed when the distillation is conducted under ordinary conditions. Furthermore, it is evident that the improvement over conventional practice becomes greater with increase in the operating temperatures and pressures.

A number of other pairs of comparative experiments were carried out as just described, except that, instead of para-tertiary-butylcatechol, the vinyltoluene under treatment contained the respective other polymerization inhibitors named in the following Table III. The purpose was to determine the extent to which the vinyltoluene becomes polymerized during passage through the respective stills A and B. The amount of polymeric vinyltoluene formed was determined as described above. These data are collected in Table III, wherein the column headings have the same meaning as did those of Table II.

Table III

| Inhibitor, parts per million | Still A—Hot inventory | | Still B—Cold inventory | |
| --- | --- | --- | --- | --- |
| | Temperature, °C. | Polymer, percent by weight | Temperature, °C. | Polymer, percent by weight |
| Sulphur, 50 p. p. m | 106 | 2.2 | 107 | 0.6 |
| | 114 | 5.7 | 114 | 1.4 |
| | 126 | 13.8 | 126 | 8.0 |
| Dinitro-o-cresol, 50 p. p. m | 109 | 0.3 | 109 | 0.0 |
| | 117 | 1.3 | 118 | 0.0 |
| | 126 | 7.5 | 128 | 0.2 |
| Dinitro-o-cresol, 50 p. p. m.+Sulphur, 50 p. p. m | 98 | 0.0 | 99 | 0.0 |
| | 110 | 3.7 | 108 | 1.2 |
| | 116 | 8.7 | 117 | 1.9 |
| | 124 | 13.6 | 126 | 1.9 |
| p-Tert-Butyl-Catechol, 50 p. p. m | 106 | 0.0 | 109 | 0.0 |
| | 113 | 1.3 | 113 | 0.9 |
| | 125 | 6.8 | 127 | 0.9 |

It is evident from Tables II and III that, although the inhibitors differ from one another in their efficacy in preventing formation of polymer, in each case distillation by the improved process of the invention has a marked effect of further decreasing the amount of polymer formed. Furthermore, this beneficial reduction in polymer formation is effected to a greater degree with increasing temperature in the zone of boiling.

EXAMPLE 3

As an illustration of the application of this invention to thermally unstable substances other than those thermally polymerizable, isobutyl bromide was treated in the comparative demonstration stills, A and B, described in Example 2. Isobutyl bromide is known to be sensitive to the temperatures obtained during its distillation at atmospheric pressure. Its thermal instability is known to become greater with increase in its purity.

Isobutyl bromide was fed to each of the stills A and B described in Example 2, while operating the stills under total reflux and withdrawing material as bottoms product at a rate corresponding to the rate of feed such that the inventory time for material in the stills was approximately 3½ hours. Both stills were operated at atmospheric pressure and at reflux temperatures of from 87° to 90° C. The material in the inventory reservoir of still B was cooled to, and maintained at, temperatures of from 25° to 35° C.

Samples of the products so obtained and of the isobutyl bromide feed were separately subjected to a distillation according to a standardized method, designated ASTM–86–46, to determine the boiling range. The boiling ranges obtained for these samples are compared in Table IV.

Table IV

[ASTM–86–46 boiling range, temperature in ° C. vs. distillate in cc.

| Isobutyl bromide | Feed, ° C. | Cold inventory, ° C. | Hot inventory, ° C. |
| --- | --- | --- | --- |
| First drop | 87.8 | 88.2 | 87.0 |
| 5 cc | 91.0 | 90.9 | 90.4 |
| 10 cc | 91.5 | 91.4 | 91.0 |
| 20 cc | 92.0 | 91.8 | 91.6 |
| 30 cc | 92.3 | 92.4 | 92.0 |
| 40 cc | 92.6 | 92.7 | 92.5 |
| 50 cc | 93.0 | 93.3 | 93.0 |
| 60 cc | 93.4 | 93.8 | 93.6 |
| 70 cc | 94.0 | 94.9 | 94.9 |
| 80 cc | 95.0 | 96.6 | 97.0 |
| 90 cc | 98.2 | 103.2 | 106.0 |
| 95 cc | 104.8 | 120.5 | 168.0 |

From Table IV it will be evident that the isobutyl bromide is adversely affected by heating to distillation temperatures, the fore-part of its boiling range being lowered by the formation of a lower-boiling by-product and the end-part of its boiling range being considerably raised by the formation of a higher-boiling by-product. However, the deleterious effect of distillation heating has been considerably reduced by the use of the reduced temperature inventory vessel according to this invention.

The invention is applicable to distillations under any otherwise operable pressures, whether at, above, or below atmospheric pressure. Also, the modifications described may be made to any or all of the columns of a plural still distillation assembly.

I claim:

1. A process of continuous distillation which comprises the steps of feeding a heat-sensitive distillable material to a distillation column, heating said distillable material to form a vapor phase, separating said vapor phase from the liquid phase, withdrawing the liquid from the bottom of said column, reheating part of said withdrawn liquid in a reboiler to cause vaporization of a portion thereof and returning the vapor to said column, holding part of said withdrawn liquid in a vessel in free communication with, and at a level approximately the same as the normal level of, liquid in said reboiler and maintaining the liquid in said vessel at a temperature lower than the temperature of the liquid in the reboiler.

2. In a process for continuous distillation wherein a heat-sensitive liquid material is fed into a distillation column and separated into a vapor phase and a liquid phase and wherein the liquid flows to the bottom of the column and wherein the column residue liquid is vaporized in a reboiler and part of the column residue liquid is withdrawn from the distillation system, the improvement which comprises withdrawing the residue liquid from the bottom of the column, holding a part of that residue liquid in a vessel in free communication with, and at a level approximately the same as the normal level of, liquid in the reboiler and cooling the residue liquid in said vessel to a temperature below the temperature in said reboiler.

3. A method as claimed in claim 2, wherein the heat-sensitive liquid starting material is vinyltoluene comprising impurities incident to its manufacture.

KENNETH E. COULTER.

References Cited in the file of this patent

UNITED STATES PATENTS

| Number | Name | Date |
|---|---|---|
| 1,318,657 | Frasch | Oct. 14, 1919 |
| 1,601,729 | Faragher et al. | Oct. 5, 1926 |
| 1,914,921 | Lacy | June 20, 1933 |